Jan. 22, 1957  M. S. SNELL  2,779,016
ELECTRICALLY OPERATED INDICATING INSTRUMENTS
Filed Dec. 4, 1953  2 Sheets-Sheet 1
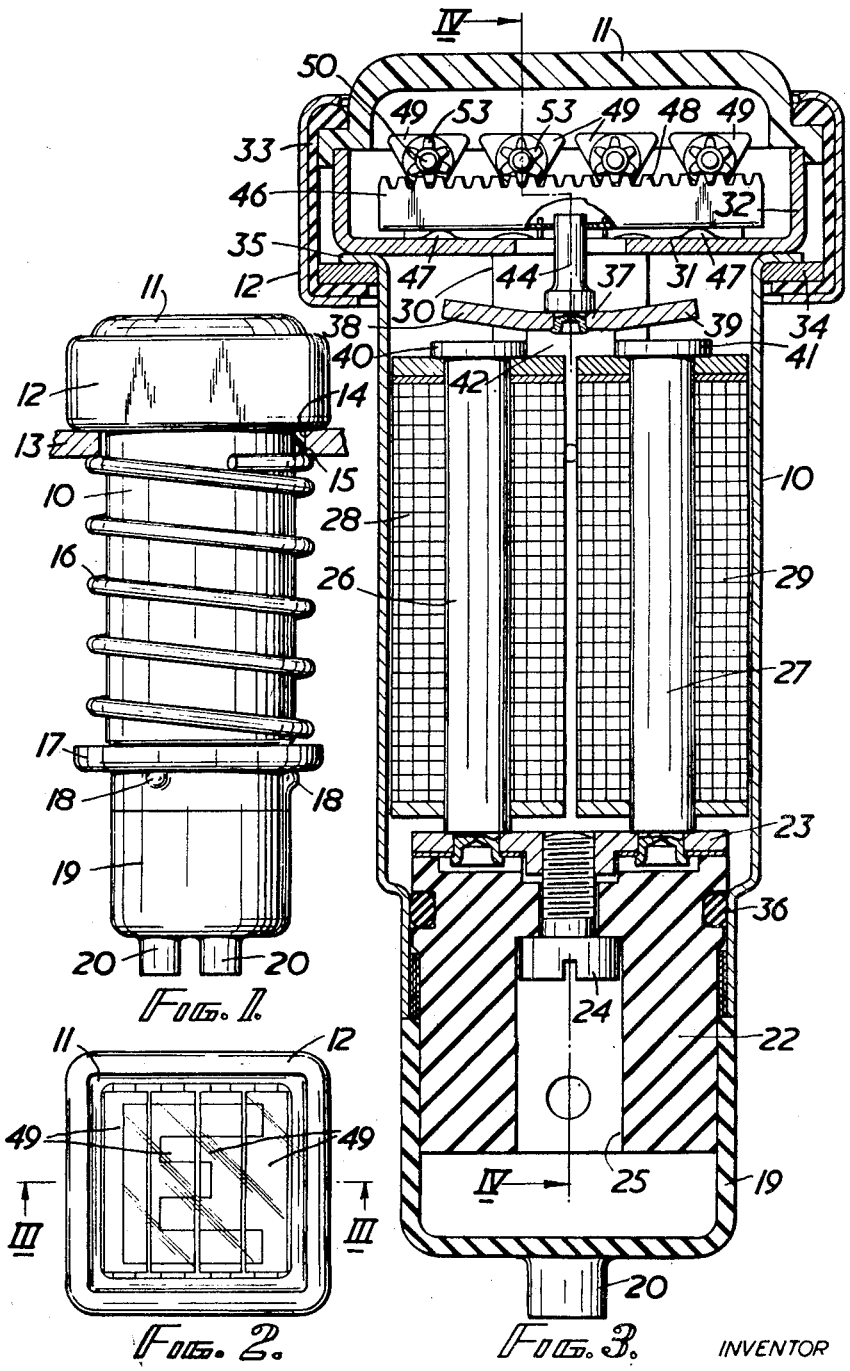
INVENTOR
MAURICE S. SNELL
BY Reynolds, Beach & Christensen
ATTORNEYS

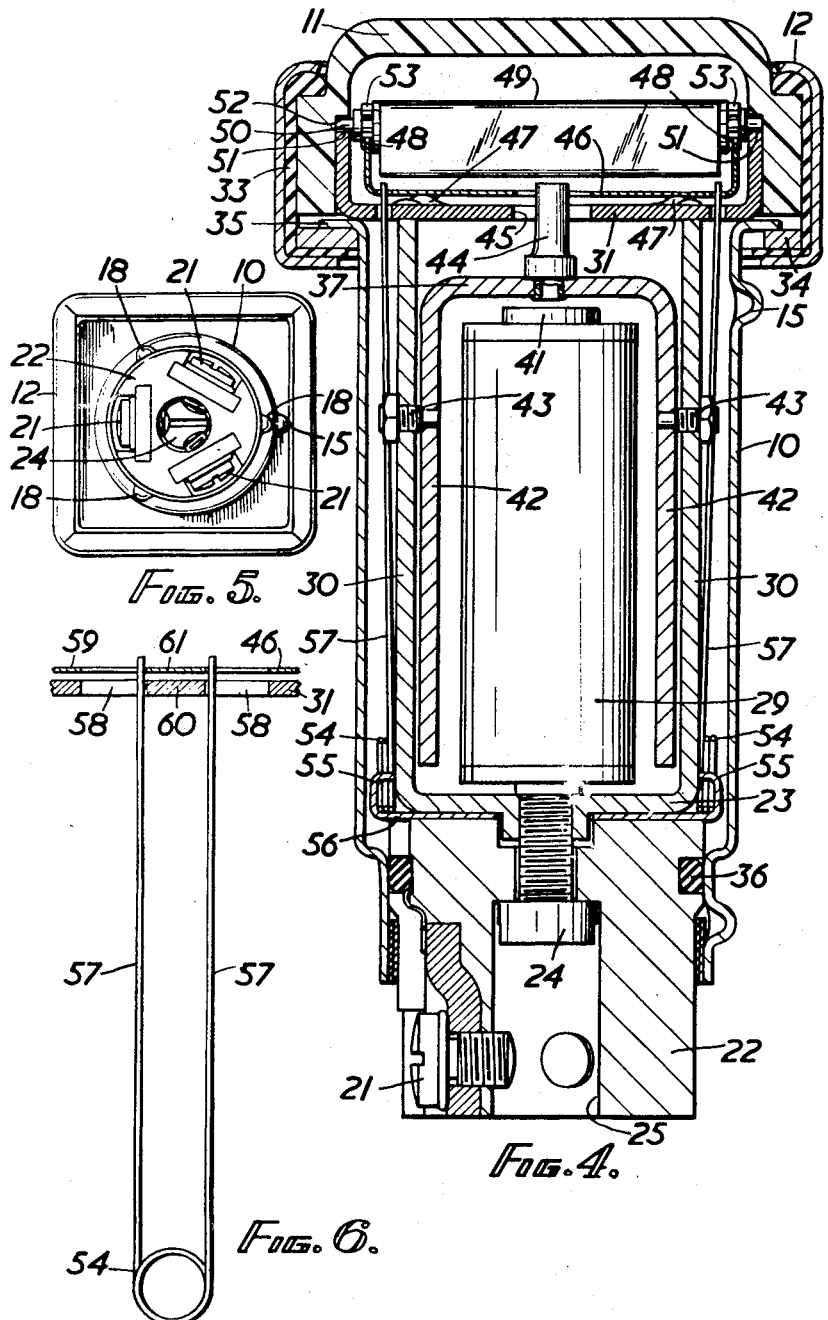

United States Patent Office 2,779,016
Patented Jan. 22, 1957

2,779,016

ELECTRICALLY OPERATED INDICATING INSTRUMENTS

Maurice S. Snell, Cranham, England, assignor to Dowty Equipment Limited, Cheltenham, England Application December 4, 1953, Serial No. 396,270

Claims priority, application Great Britain December 8, 1952

2 Claims. (Cl. 340—378)

This invention relates to instruments designed to give a qualitative indication or signal by the display of a legend, colour or other appropriate character. More particularly the invention is concerned with an electrically operated instrument for giving an indication or signal of a physical condition which is detectable by electrical means. The need for such an instrument arises, amongst other examples, in aircraft where it is often desirable to be able to see at a glance the condition of a part of the aircraft or of a piece of equipment without necessarily knowing the quantitative aspect of said condition.

The principal object of the present invention is to provide a construction of instrument capable of giving two, or preferably three, alternative indications or signals on a single display area which is large in proportion to the frontal area of the instrument, as a result of energization of electrical actuating elements which may be large because of the weakness of the current employed, yet which will not in any way exceed the relatively small frontal area available to the instrument.

Another object is to provide an instrument in accordance with the foregoing object, which is sensitive in operation and can change from one signal to another without appreciable time lag.

One form of instrument constructed in accordance with the invention is illustrated in the accompanying drawings, of which:

Figure 1 is an elevational view, and Figure 2 is a plan view;

Figure 3 is a central sectional view in elevation to an enlarged scale on the line III—III of Figure 2;

Figure 4 is a sectional view in elevation on the line IV—IV of Figure 3;

Figure 5 is an end view of the base of the instrument; and

Figure 6 is a fragmentary view of spring centering mechanism embodied in the instrument.

Referring to Figures 1 and 2, the instrument has an outer cylindrical casing 10 with a transparent window 11 secured to it by a bezel 12. As shown in Figure 1, the instrument is mounted within a circular aperture in a panel 13 wherein a notch 14 is formed to receive a projecting pip 15 on the casing which determines the correct angular location of the instrument face on the panel. The instrument is secured with the rear face of the bezel 12 bearing against the panel 13 by a spring 16 which is interposed between the rear of the panel and a retaining ring 17 which is held on the opposite end of the casing 10, this ring 17 being internally slotted so as to be slid over the casing 10 and over retaining pips 18 formed thereon, and then turned in the manner of a bayonet catch to rest against the retaining pips 18 and hold the spring 16 compressed. A moulded rubber cap 19 is fitted over the base of the instrument and is formed with sleeve-like projections 20 through which electric leads may extend to terminal connections 21 within the cap 19, three of which are shown, see Figure 5.

Referring to Figures 3, 4 and 5, the terminals 21 are mounted in a base moulding 22 of insulating material which forms the foundation for the instrument mechanism. A U-shaped yoke 23 of magnetic material, having upstanding limbs 30, is fixed to the moulded base 22 by a screw 24 which is socketed into a central recess 25 in the base 22, and that portion of the yoke 23 adjacent the base moulding 22 has the cores 26 and 27 of two laterally spaced electro-magnetic coils 28 and 29 fixed thereto. The upstanding limbs 30 of the yoke 23 are bridged at their upper ends by a cup or box 31 which is of shallow rectangular shape. The window 11, which is of moulded transparent plastic material, rests at its edges on the walls 32 of the box 31 and is held in engagement therewith by the bezel 12 which is lined with an internal facing 33 of resilient material. The bezel 12 is swaged inwardly around a circularly apertured plate 34 through which the casing 10 projects, and the bezel 12 thus serves to clamp an out-turned flange 35 of the cylindrical casing 10 between the walls 32 and the plate 34. A resilient packing ring 36 is recessed into the moulded base 22 and seals outwardly against the internal surface of the casing 10 to exclude dirt and moisture from the mechanism.

The movable part of the mechanism is actuated by an armature 37 having two laterally extending arms 38 and 39 which project over, but are spaced from, pole pieces 40 and 41 on the ends of the magnetic cores 26 and 27 respectively. Integral with the armature 37 are downwardly extending arms 42 each of which is spaced from, but pivoted to, an upstanding limb 30 of the yoke 23 by means of a stub pivot pin 43 screwed into the limb 30. The downward extension of the arms 42 below the pivots 43 substantially balances the armature 37 about its pivotal axis against gravitational effects, while the breadth of the arms 42 is less than that of the limbs 30 so that the magnetic flux in the yoke 23 can cross the gaps between the limbs 30 and the arms 42 in any swung position of those arms, without exerting any magnetic moment between them about the axis of the pivots 43. The circuit of the magnetic flux may thus be completed through either the laterally extending arm 38 of the armature and the pole piece 40 or the laterally extending arm 39 and the pole piece 41. The completion of the magnetic circuit in the manner described together with the balancing of the armature enhances the sensitivity of the instrument to small energizing currents in the coil 28 or 29, yet these coils by virtue of their length are of adequate strength to accomplish any required movement quickly.

A pin 44 riveted to the centre of the armature 37 extends upwardly through a clearance hole 45 in the box 31 and through a fitting hole in a channel-shaped rack 46. The rack 46 can easily slide laterally over bosses 47 projecting upwardly from the base of the box 31, and both sides of the channel-shaped rack 46 are formed with rack teeth 48 along their upper edges.

The indicating elements of the instrument comprise several, in the illustrated example four, equilateral triangular prisms 49 having pivots 50 at each end which rest in slots 51 cut in the upper edges of the walls 32 of the box 31, the pivots 50 being retained within the slots 51 by an internal step 52 formed in the moulded window 11. At each end of each prism 49 a gear pinion 53 is fixed coaxial with the pivot 50 and each pinion 53 intermeshes with the teeth 48 of the rack 46 at the corresponding side of the latter. Thus, when either coil 28 or 29 is energized the armature 37 will rock about its pivots 43 so that the pin 44 will slide the rack 46 to one side or the other and rotate the prisms 49 in unison. The formation of the rack as a unitary member having intermeshing engagement with the pinions at both ends of each prism provides a parallel motion for the rack without the use of external guides. In order to maintain the rack 46 centralized when neither coil 28 or 29 is energized, two hair-pin springs 54 (see Figures 4 and 6) are provided. Each spring 54 is located near the base moulding 22 by an inturned tag 55 on a metal disc 56 which is interposed between the base moulding 22 and the yoke 23. The limbs 57 of this spring 54 extend upwardly within the casing 10 and through elongated slots 58 and 59 formed in the base of the box 31 and the base of the rack 46 respectively, see Figure 6. There is thus a bridge 60 left between the slots 58 and a bridge 61 left between the slots 59 and both these bridges are of the same width. The limbs 57 of the springs 54 are pre-loaded for approach and thus bear against opposite sides of the bridges 60 and 61 in the box 31 and the rack 46 respectively. Each limb 57 therefore acts resiliently on the rack 46 to centralise it with respect to the bridge 60 in the box 31. The extent of elongation of the slots 58 provides a convenient means for determining the extent of the displacement of the rack from either side of its central position. If then, one face of each prism is displayed in the central position of the rack 46, it is arranged that the other two faces are alternately displayed upon displacement of the rack 46 to one extreme position or the other. Thus if one face of each prism 49 is displayed when neither coil 28 or 29 is energized, a second face of each prism 49 will be displayed when the coil 28 is energized, and a third face will be displayed when the coil 29 is de-energized so that the springs 54 maintain the rack 46 in its central position. All this is accomplished by only two coils 28 and 29, which can be accommodated within the small frontal area of the instrument, whereas there would not be room for three such coils of adequate size.

In order that the prisms may together present a substantially continuous display surface they must be disposed in close proximity at their adjacent edges, and the maximum number of sides to each prism is therefore three. The instrument described in the foregoing example is primarily intended for use on an aircraft instrument panel to give indications to the pilot of a condition of the aircraft or of a piece of equipment therein, and for this purpose the instrument can be made relatively small if it is only required to display single numbers, letters or other characters which are readily visible to and understandable by the pilot. For example, the display area shown in Figure 2 may measure approximately one inch square or slightly less to give a readily visible indication at the normal distance between the pilot and the instrument panel.

In using the movement of an armature as described to effect rotation of the prisms, consideration of the magnetic flux necessary to attract the armature from its rest position against the opposing forces of friction and the centering springs requires that the electro-magnetic means shall be relatively large in relation to the size of the prism assembly. The electro-magnetic means can nevertheless be accommodated within the lateral boundaries of the prism assembly, and in a small indicating instrument as previously referred to, for which the invention is primarily intended, the electro-magnetic means will be neither bulky nor heavy. An advantage of the construction is that there will be no sensible time lag in a change from one indication to another.

I claim:

1. An indicating instrument for use in a space of restricted frontal area, comprising an elongated casing, a display head of an area approximating the available frontal area fixed to one end of the casing, indicating devices movably mounted in said head, an actuator mounted in said head, behind the indicating devices, for shifting transversely of the head to either side of a neutral position, and operatively connected to said indicating devices to move the same between three indicating positions, corresponding respectively to the three positions of the actuator, a yoke of magnetic material the two limbs whereof are directed lengthwise within the casing, two coils mounted on said yoke in side by side disposition, directed lengthwise of the casing, an armature having two limbs directed lengthwise of and located alongside the limbs of the yoke, and tiltably mounted thereon, said armature having also two arms positioned for attraction by the pole pieces of the respective coils when energized, whereby to tilt the armature in one or the other sense from a neutral position, means operatively connecting the armature and said actuator for shifting of the latter in opposite senses as the armature tilts in opposite senses, and spring means operatively connected to the actuator to retain the same yieldingly in its neutral position.

2. An indicating instrument as in claim 1, wherein the arms of the armature extend beyond their pivots so as to balance the armature and the driving mechanism.

References Cited in the file of this patent

UNITED STATES PATENTS

| | | |
|---|---|---|
| Re. 17,252 | Snavely | Apr. 2, 1929 |
| 1,718,625 | Bartoletti | June 25, 1929 |
| 1,765,073 | Hester | June 17, 1930 |
| 2,100,364 | Stivender | Nov. 30, 1937 |
| 2,209,382 | Blatner | July 30, 1940 |
| 2,390,415 | Bailey et al. | Dec. 4, 1945 |
| 2,398,681 | Webb | Apr. 16, 1946 |